H. B. JOHNSON.
REIN OPERATED MEANS FOR MOTOR CARS.
APPLICATION FILED APR. 5, 1918.
1,300,619.
Patented Apr. 15, 1919.
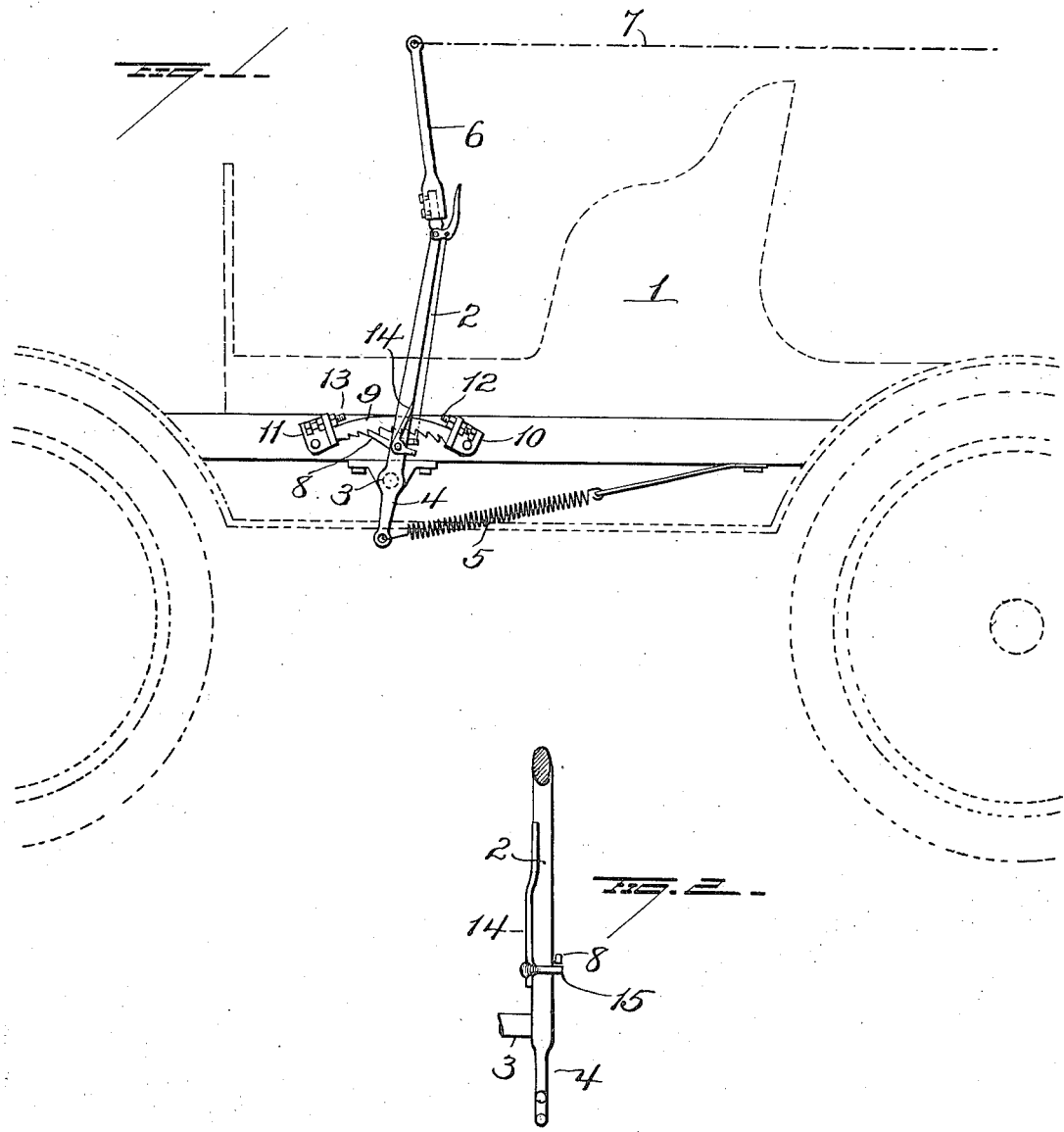

UNITED STATES PATENT OFFICE.

HOMER B. JOHNSON, OF SHERIDAN, INDIANA.

REIN-OPERATED MEANS FOR MOTOR-CARS.

1,300,619. Specification of Letters Patent. Patented Apr. 15, 1919.

Original application filed July 27, 1917, Serial No. 183,162. Divided and this application filed April 5, 1918. Serial No. 226,889.

*To all whom it may concern:*

Be it known that I, HOMER B. JOHNSON, a citizen of the United States, and a resident of Sheridan, in the county of Hamilton and State of Indiana, have invented certain new and useful Improvements in Rein-Operated Means for Motor-Cars; and I do hereby declare the following to be a full, clear, and exact description of the invention, such as will enable others skilled in the art to which it appertains to make and use the same.

This invention relates to improvements in rein-operative control means for motor cars, this application being a division of application for patent filed by me July 27th, 1917, and designated by Serial No. 183,162. One object of the present invention is to provide simple and efficient means which may be readily applied to an automobile of standard construction, to facilitate the control of the same from a position in rear thereof, as from the operator's seat of a riding plow.

With this and other objects in view, the invention consists in certain novel features of construction and combinations of parts as hereinafter set forth and pointed out in the claims.

In the accompanying drawing, Figure 1 is an elevation showing a portion of an automobile of the "Ford" type and illustrating the application of my improvements, and Fig. 2 is a detail view.

1 represents an automobile which may be of the "Ford" or other type, but for convenience I have shown and will describe my improvements as applied to a Ford automobile.

The control lever 2 of the car is pivotally supported at 3 and its lower short arm 4 is connected, by means of a spring 5 with a stationary part of the machine. An extension arm 6 is removably attached to the handle portion of the control lever 2 and to the upper end of said extension arm, one end of a cable 7 is attached,—said cable being extended rearwardly to a position within convenient reach of the operator on the plow. The control lever 2 carries a pawl 8 to engage the teeth of a stationary rack or segment 9 and at respective ends of said segment, brackets 10 and 11 are located for the accommodation of adjustable stops 12—13. An L-shaped trip lever 14 is pivotally mounted on the control lever 2 in proximity to the pawl 8 and is provided with a toe 15 to engage the heel of said pawl.

When the cable 7 is pulled by the operator, the control lever 2 will be moved rearwardly with the result of applying the brake and pulling out the clutch as is well understood in the operation of a Ford car. When the lever 2 approaches the end of its rearward throw, the trip lever 14 will engage the stop screw 12 and be moved in a direction to cause the toe 15 to engage the heel of the pawl 8 and move the latter out of engagement with the teeth of segment 9. The spring 5 will now operate to move the control lever 2 forwardly to release the brake and throw in the clutch. As the lever 2 approaches the end of its forward throw, the trip lever 14 will engage the stop 13, causing said trip lever to be turned to release the pawl 8, when said control lever may be controlled as in the normal operation of the car. The trip lever will be retained in the position to which it may be moved by the stops, by engagement with the lever 2, as illustrated in Fig. 2.

Various slight changes might be made in the details of construction of my invention without departing from the spirit thereof or limiting the scope and hence I do not wish to restrict myself to the precise details herein set forth.

Having fully described my invention what I claim as new and desire to secure by Letters-Patent, is:—

1. The combination with the control lever of an automobile, and a spring tending to move said lever in one direction, of a toothed segment, a pawl carried by the lever to engage said segment, a trip lever mounted on the control lever and having a part to engage the pawl to release the same from the segment, and stop devices at respective ends of said segment to control the operation of said trip lever.

2. The combination with the control lever of an automobile, of a spring for moving said lever in one direction, an extension arm connected with said lever, a cable connected with said extension arm for operating said lever, a toothed segment, a pawl carried by the lever to engage said segment, a trip device for said pawl, and adjustable stop devices for causing the operation of said trip device when the control lever is operated.

In testimony whereof, I have signed this specification in the presence of two subscribing witnesses.

HOMER B. JOHNSON.

Witnesses:
EMMA K. JOHNSON,
I. H. McMURTRY.